UNITED STATES PATENT OFFICE.

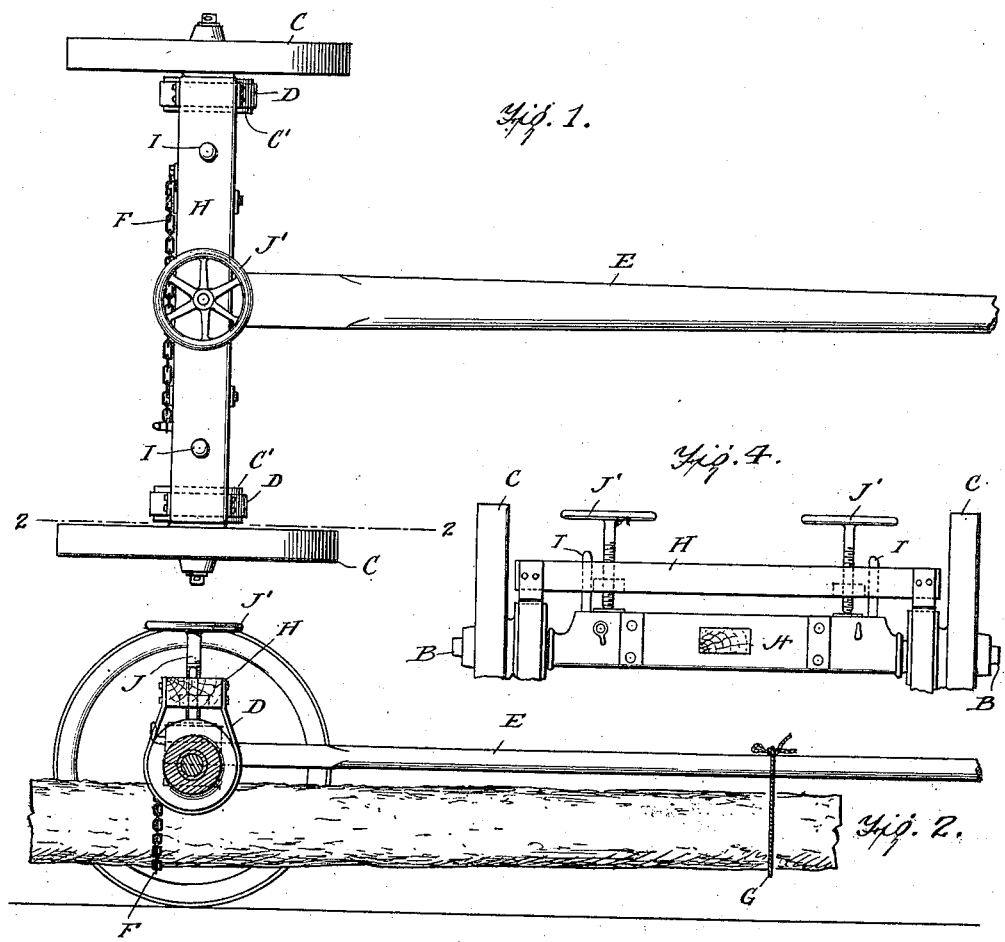

PATRICK JOHNSTON, OF WILLIAMS, ARIZONA TERRITORY.

BRAKE FOR LOGGING-CARTS.

981,568.  Specification of Letters Patent.  Patented Jan. 10, 1911.

Application filed April 25, 1910.   Serial No. 557,467.

*To all whom it may concern:*

Be it known that I, PATRICK JOHNSTON, a citizen of the United States, and a resident of Williams, in the county of Coconino and Territory of Arizona, have invented certain new and useful Improvements in Brakes for Logging-Carts, of which the following is a specification.

This invention is an improvement in logging carts or trucks and has for an object to provide a novel construction whereby the truck may be braked in order to control the same in going down hills and the invention consists in certain novel constructions and combinations of parts as will be hereinafter described and claimed.

In the drawing Figure 1 is a top plan view. Fig. 2 is a sectional elevation on about line 2—2 of Fig. 1. Fig. 3 is an end elevation partly in section, of a cart embodying my invention. Fig. 4 shows a somewhat different construction.

In carrying out my invention, I provide the axle A with spindles B on which turn the wheels C which wheels are provided with the drums C' which receive the brake bands D and may, therefore, be termed the brake drums. These drums C' are fixed in respect to their respective wheels C and turn therewith on the spindles B. The axle A also has the tongue or pole E and means are provided for sustaining a log which means may include the chain F and cable G as illustrated in Figs. 2 and 3 of the drawing.

A bolster beam H extends longitudinally above the axle A and is guided vertically in its movements toward and from the axle A by the pins I projecting upwardly from the axle A through openings in the bolster beam H and operating as will be understood from Figs. 1, 2 and 3 of the drawings. To the beam H are secured the ends of the brake bands D which extend under the brake drums C' and will be pressed into contact therewith to operate with a braking action when the beam H is forced upwardly from the axle A by the means which I will now describe.

As shown in Fig. 1, the operating means include a screw G having a threaded bearing in the beam H, and a handle or other suitable turning means J' on said screw J, the latter bearing at its point upon the axle A so that by properly turning the screw J the beam H may be forced upwardly from the axle A and cause the brake bands D to bind the drums C' with a gripping action.

My invention is especially designed for use upon the two wheeled carts such as shown and which are designed for use in lumber woods and for hauling logs, the brake being adapted for operation to control the carts in going down inclines without loosening the logs so that they may drag and thus retard to too great an extent the running of the cart.

Where desired, instead of using one screw, as shown in Figs. 1, 2 and 3, I may use two screws arranged on opposite sides of the center of the bolster beam H, as shown in Fig. 4, so that either of the screws may be operated to brake its respective wheel and prevent it from turning without braking the other wheel. By this means, I am able to avoid the customary blocking of one wheel at a time so as to work the cart out of ruts by swinging the tongue.

The band D may be made of any suitable material, width and thickness to furnish the necessary strength and the construction is easily operated and efficiently serves the purpose for which it is designed.

I claim:

1. The logging cart herein described comprising the axle having the spindles, and upwardly projecting guide pins, the pole connected to said axle, the wheels journaled on the spindles and having the brake drums in fixed relation with their respective wheels, a bolster beam extending longitudinally above the axle and having openings receiving the guide pins projecting from said axle, brake bands secured at their ends to the ends of the bolster beam and extending around the under sides of their respective brake drums and a screw threaded in the bolster beam and bearing against the axle whereby to adjust the bolster beam relatively to the axle, substantially as set forth.

2. In a braking device, the combination of an axle having spindles, wheels turning on said spindles and having brake drums in fixed relation to their respective wheels, a beam extending longitudinally over the axle, brake bands connected at their ends to said beam and extending around the under sides of their respective brake drums and means operating between the beam and the axle for forcing the beam away from the axle to set the brake, substantially as set forth.

3. The combination of an axle having spindles, wheels on the spindles and having brake drums in fixed relation to their respective wheels, a bolster beam extending longitudinally over the axle, brake bands secured at their ends to the bolster beam and extending thence around their respective brake drums and independent operating screws arranged adjacent their respective brake bands and operating between the axle and the bolster beam whereby they may be operated to adjust the beam at one or both ends relatively to the axle, substantially as and for the purposes set forth.

4. The combination of the axle having the spindles and the pole fixed to and projecting from the axle, means for suspending a log from said axle and pole, wheels on the spindles, brake drums in fixed relation to their respective wheels, a beam extending longitudinally from the axle, brake bands secured at their ends to the beam and extending thence around their respective brake drums and screw devices operating between the axle and the beam for adjusting the beam relatively to the axle, substantially as set forth.

PATRICK JOHNSTON.

Witnesses:
C. E. REAM,
J. L. BUCKLEY.